United States Patent Office 3,331,832
Patented July 18, 1967

3,331,832
MONOAZO-PIGMENTS
Hansrolf Loeffel, Neuallschwil, Switzerland, assignor to Ciba Limited, Basel, Switzerland, a Swiss company
No Drawing. Filed Oct. 18, 1963, Ser. No. 317,140
Claims priority, application Switzerland, Oct. 23, 1962, 12,403/62; Sept. 17, 1963, 11,463/63
7 Claims. (Cl. 260—192)

The present invention provides valuable new monoazo pigments of the general formula (1) 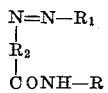

in which R represents the grouping $-R_3CONHR_4NHCOR_5$ or

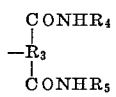

$R_1$ represents an anthraquinone radical, $R_3$, $R_4$ and $R_5$ represents aromatic radicals, especially benzene radicals, and $R_2$ represents the radical of a coupling component that contains a hydroxyl group or an enolizable keto group in ortho-position to the azo group. Of special interest are dyestuffs of the formula

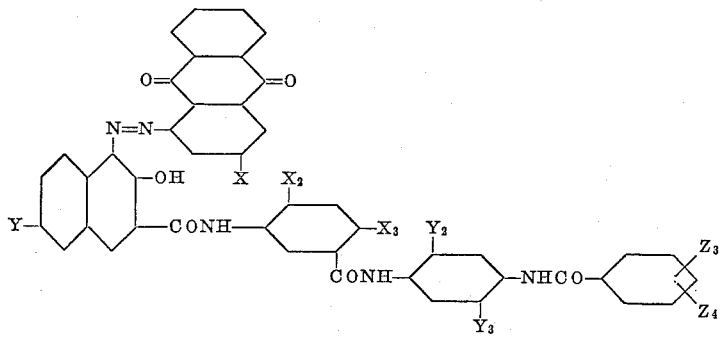

in which X represents a halogen atom or a trifluoromethyl group, Y represents hydrogen or halogen atoms, $X_2$, $X_3$, $Y_2$, $Y_3$, $Z_3$ and $Z_4$ represent hydrogen or alkyl or alkoxy groups or especially halogen atoms.

The new dyestuffs can be obtained for example when (a) a monocarboxylic acid halide free from acidic groups imparting solubility in water that corresponds to the formula (3) 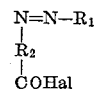

is condensed in a molar ratio of 1:1 with an amine of the formula (4) $\quad H_2N-R_3-CONH-R_4-NHCOR_5$ or (b) a monocarboxylic acid halide free from acidic groups imparting solubility in water that corresponds to the formula (5) 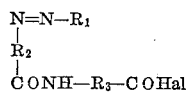

is condensed in a molar ratio of 1:1 with an amine of the formula (6) $\quad H_2N-R_4-NHCOR_5$ in which formulae the radicals $R_1$ and $R_5$ have the meanings given above.

The azo carboxylic acids from which the acid halides of Formula 3 are derived are advantageously obtained by coupling a diazotized aminoanthraquinone, for example, an α- or β-aminoanthraquinone with a phenolic or enolic coupling component that contains a carboxylic acid group or a carboxylic acid ester group; in the latter case, hydrolysis of the ester group is necessary. The following aminoanthraquinones may be mentioned:

1-aminoanthraquinone,
1-amino-2-chloranthraquinone,
1-amino-2-bromanthraquinone,
1-amino-3-chloranthraquinone,
1-amino-4-chloranthraquinone,
1-amino-6- or 7-chloranthraquinone,
1-amino-8-chloranthraquinone,
1-amino-5:8-dichloranthraquinone,
1-amino-3-bromanthraquinone,
1-amino-2:4-dibromanthraquinone,
1-amino-2-methylanthraquinone,
1-amino-3-fluoranthraquinone,
1-amino-4-, 5- or 6-methoxyanthraquinone,
1-amino-3-trifluoromethylanthraquinone,
1-amino-4- or 5-benzoylaminoanthraquinone,
1-amino-4-cyanoanthraquinone,
1-amino-3-cyanoanthraquinone,
1-amino-4-nitroanthraquinone,
1-amino-2-bromo-4-cyanoanthraquinone,
2-aminoanthraquinone,
2-amino-3-chloranthraquinone,
2-amino-3-bromanthraquinone,
2-amino-1:3-dichloranthraquinone,
2-amino-3-methoxyanthraquinone, and
5-amino-1:9-isothiazole-anthrone.

As coupling components 2-hydroxy-3-naphthoic acid, 6-bromo-2-hydroxy-3-naphthoic acid and 6-methoxy-2-hydroxy-3-napthoic acid are mainly used. The following may also be mentioned:

2-hydroxycarbazole-3-carboxylic acid,
2-hydroxydiphenyleneoxide-3-carboxylic acid,
2-hydroxyanthracene-3-carboxylic acid,
1-(meta- or para-carboxyphenyl)-3-methyl-5-pyrazolone, aceto-acetic acid ethyl ester, and
3- or 4-acetoacetylaminobenzene carboxylic acid.

The azocarboxylic acids thus obtained are treated with agents that are capable of converting carboxylic acids into their acid halides, for example, their acid chlorides or bromides, particularly such agents as phosphoric acid halides, for example, phosphorus pentabromide or phosphorus trichloride or phosphorus pentachloride, phosphorus oxyhalides and advantageously thionyl chloride.

Treatment with such acid halogenating agent is advantageously carried out in an inert organic solvent such as dimethylformamide or a chlorobenzene, for example, monochlorobenzene, dichlorobenzene, toluene, xylene or nitrobenzene; dimethylformamide may also be added when the five last-mentioned solvents are used.

In the preparation of the carboxylic acid halides it is generally of advantage first of all to dry the azo compounds which have been prepared in aqueous medium, or to free them from water by azeotropic distillation in an organic solvent. If desired, this azeotropic drying can be carried out immediately prior to the treatment with the acid halogenating agents.

In method (a) of the present process the monocarboxylic acid halides so obtained are condensed in a molar ratio of 1:1 with aromatic monamines of the Formula 4. As examples the following amines may be mentioned:

2:5-dichloro-1-benzoylamino-4(4'-chloro-3'-amino)-benzoylaminobenzene,
2:5-dichloro-1-benzoylamino-4(2':4'-dichloro-5'-amino)-benzoylaminobenzene,
2:5-dichloro-1-benzoylamino-4(3'-amino)-benzoylaminobenzene,
2:5-dichloro-1-benzoylamino-4(4'-methoxy-3'-amino)-benzoylaminobenzene,
2:5-dimethyl-1-benzoylamino-4(3'-amino)-benzoylaminobenzene,
2:5-dimethyl-1-benzoylamino-4(4'-chloro-3'-amino)-benzoylaminobenzene,
2:5-dimethyl-1-benzoylamino-4(4'-methoxy-3'-amino)-benzoylaminobenzene,
2-chloro-5-methoxy-1-benzoylamino-4(4'-methoxy-3'-amino)-benzoylaminobenzene,
2-chloro-5-methoxy-1-benzoylamino-4(4'-chloro-3'-amino)-benzoylaminobenzene,
2-methyl-5-chloro-1-benzoylamino-4(4'-methoxy-3'-amino)-benzoylaminobenzene,
2-methyl-5-chloro-1-benzoylamino-4(4'-chloro-3'-amino)-benzoylaminobenzene,
2-chloro-5-methoxy-1-benzoylamino-4(3'-amino)-benzoylaminobenzene,
2-methyl-5-chloro-1-benzoylamino-4(3'-amino)-benzoylaminobenzene,
2:5-dimethyl-1-benzoylamino-4(2':4'-dichloro-5'-amino)-benzoylaminobenzene,
2:5-dichloro-1(4'-chloro)-benzoylaminobenzene-4(4''-chloro-3''-amino)-benzoylaminobenzene,
2:5-dichloro-1(4'-chloro)-benzoylamino-4(2'':4''-dichloro-5''-amino)-benzoylaminobenzene,
2:5-dichloro-1(4'-chloro)-benzoylamino-4(4''-chloro-3''-amino)-benzoylaminobenzene,
2:5-dichloro-1(2':4'-dichloro)-benzoylamino-4(2'':4''-dichloro-5''-amino)-benzoylaminobenzene,
2:5-dichloro-1:α-naphthoylamino-4(2':4'-dichloro-5'-amino)-benzoylaminobenzene,
2:5-dichloro-1(2':4'-dichloro)-benzoylamino-4(3''-amino)-benzoylaminobenzene,
2-amino-terephthalic acid dianilide,
2-amino-terephthalic acid-di-(para-chloranilide) and
2-amino-terephthalic acid-di-(meta-trifluoromethylanilide).

The condensation between the carboxylic acid halides of the kind defined above and the amines is advantageously carried out in an anhydrous medium. Under these conditions it generally proceeds surprisingly easily at temperatures within the boiling range of the common organic solvents such as toluene, monochlorobenzene, dichlorobenzene, trichlorobenzene, nitrobenzene and the like. In order to accelerate the reaction it is generally of advantage to use an agent capable of binding acid, for example, anhydrous sodium acetate or pyridine. Some of the dyestuffs obtained are crystalline and some are amorphous and they are generally obtained in a good yield and in a pure state. It is generally of advantage first to separate the acid chlorides prepared from the carboxylic acids. In some cases, however, separation of the acid chlorides can be dispensed without harm, and the condensation carried out immediately subsequent to the preparation of the carboxylic acid chlorides.

The new dyestuffs are valuable pigments which can be used for a very wide variety of purposes. They can be used, for example, in a finely divided form for the spin dyeing of rayon, viscose, cellulose, ethers, cellulose esters, polyamides, polyurethanes and polyesters; for the preparation of colored lacquers or as lake-formers; and for coloring solutions and products made from cellulose acetate, nitrocellulose, natural or synthetic resins such as polymerization or condensation resins, for example, aminoplasts, alkyd resins, phenoplasts, polyolefines such as polystyrene, polyvinyl chloride, polyethylene, polypropylene, polyacrylonitrile, rubber, casein, silicone and silicone resins. They can also be used with advantage in the manufacture of colored pencils, cosmetic preparations and laminated sheet material.

In contrast with comparable dyestuffs described in United States specification No. 2,273,116, patented February 17, 1942, to Georg Kraenzlein et al., the dyestuffs obtained by the process of the invention are distinguished by a substantially better fastness to migration.

The following examples illustrate the invention. Unless otherwise stated, the parts and percentages are by weight.

*Example 1*

130 parts of sulfuric acid monohydrate were cooled to 10° C. and 7.1 parts of sodium nitrite were added in small portions with rapid stirring. The nitrosyl sulfuric acid was heated to 70° C. in the course of 40 minutes, kept at that temperature for 30 minutes and then cooled to room temperature. 25.75 parts of 1-amino-3-chloranthraquinone were next added in the course of 1 hour, and the mixture stirred for a further hour. The sulfuric acid solution was cautiously poured on to 350 parts of ice, the diazonium sulfate being precipitated in the form of a yellow suspension.

The solution of the coupling component was prepared as follows: 19.1 parts of 2:3-hydroxynaphthoic acid were dissolved in 400 parts of a 1:1 alcohol and water mixture and 20 parts of 30% aqueous sodium hydroxide solution. After filtering until clear, 30 parts of sodium acetate were added and the pH value adjusted to 6 with acetic acid.

The solution thus prepared was cooled to 10° C. and the diazonium sulfate obtained as described in the first paragraph above was run in, concentrated sodium hydroxide solution being simultaneously added dropwise (pH value 4 to 6). After the coupling the reaction mixture was heated to 70° C., filtered, and the filter residue washed until free from salt. 190 parts of moist filter residue were obtained.

The press-cake was freed from water azeotropically by heating to 150° C. internal temperature in 650 parts of ortho-dichlorobenzene (with use of a descending condenser). After cooling to 95° C., one part of dimethyl formamide and 24 parts of thionyl chloride were added dropwise and the whole stirred for a further two hours at 100 to 110° C. The reaction mixture was cooled to 20° C., filtered, the filter residue washed with 520 parts of dichlorobenzene and 400 parts of benzene, and the acid chloride dried in vacuo at 50° C.; yield: 43.35 parts.

2.375 parts of the acid chloride were introduced at room temperature into 170 parts of dichlorobenzene. 2.46 parts of 2:5-dichloro-1-benzoyl-amino-4-(2':4'-dichloro-5'-amino)-benzoylaminobenzene, dissolved in 80 parts of hot dichlorobenzene, were then added. The whole was heated to 60° C., the temperature was raised to 140° C. in the course of 8 hours, and stirring continued for a further 8 hours at 140° C. The pigment obtained was filtered off at 100° C. and then washed with 250 parts of hot dichlorobenzene, 120 parts of methanol and 150 parts of water 3.85 parts of a dyestuff of the formula

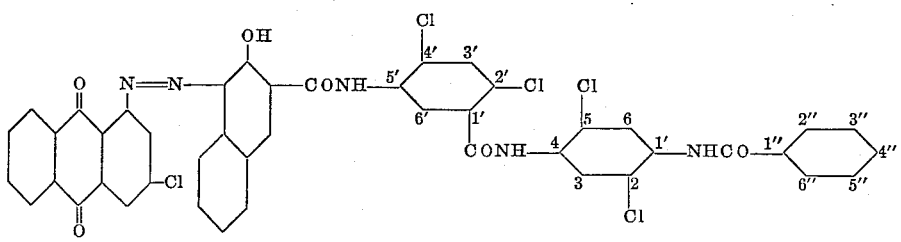

were obtained which yielded scarlet-red dyeings possessing a very good fastness to light and to migration when worked into polyvinyl chloride on a roller mill.

In the following table there are listed further components which yield pigment dyestuffs in the manner described above and that likewise exhibit very good properties of fastness. Column I indicates the diazo component, Column II the condensation base and Column III the tint obtained with the pigment in a polyvinyl chloride film.

| No. | I | II | III |
|---|---|---|---|
| 1 | 1-amino-3-chlor-anthraquinone. | 2:5-dichloro-1-benzoyl-amino-4-(2':4'-dichloro-5'-amino)-benzoylamino-benzene. | Scarlet. |
| 2 | ----do---- | 2:5-dimethyl-1-benzoyl-amino-4-(2':4'-dichloro-5'-amino)-benzoylamino-benzene. | Do. |
| 3 | ----do---- | 2:5-dichloro-1-benzoyl-amino-4-(4'-methoxy-5'-amino)-benzoylamino-benzene. | Do. |
| 4 | ----do---- | 2:5-dichloro-1-benzoyl-amino-4-(4'-chloro-5'-amino)-benzoylamino-benzene. | Do. |
| 5 | ----do---- | 2:5-dimethyl-1-benzoyl-amino-4-(4'-methoxy-5'-amino)-benzoylamino-benzene. | Orange. |
| 6 | ----do---- | 2:5-dichloro-1-(parachloro)-benzoylamino-4-(-5'-amino)-benzoylamino-benzene. | Do. |
| 7 | ----do---- | 2-chloro-5-methoxy-1-benzoylamino-4-(2':4'-dichloro-5'-amino)-benzoylaminobenzene. | Scarlet. |
| 8 | ----do---- | 2:5-dichloro-1-(2'':4''-dichloro)-benzoylamino-4-(2':4'-dichloro-5'-amino)-benzoylaminobenzene. | Orange. |
| 9 | ----do---- | 2:5-dichloro-1-α-naphthyl-amino-4-(2':4'-dichloro-5'-amino)-benzoylamino-benzene. | Scarlet. |
| 10 | ----do---- | 2:5-dichloro-1-amino-4-(para-chloro)-benzoyl-aminobenzene. | Do. |
| 11 | ----do---- | 2:5-dimethyl-1-amino-4-benzoylaminobenzene. | Bluish-red. |
| 12 | ----do---- | 2:5-dichloro-1-amino-4-α-naphthylaminobenzene. | Scarlet. |
| 13 | ----do---- | 2:5-dichloro-1-amino-4-(2':5'-dichloro)-benzoylaminobenzene. | Do. |
| 14 | ----do---- | 2:5-dichloro-1-amino-4-(2':4'-dichloro)-benzoylaminobenzene. | Red. |
| 15 | ----do---- | 2-amino-terephthalic acid dianilide. | Orange. |
| 16 | ----do---- | 2-amino-terephthalic acid-di-(2':5'-di-chloro)-anilide. | Scarlet. |
| 17 | ----do---- | 2:5-dichloro-1-(4'-chloro)-benzoylamino-4-(2':4'-dichloro-5'-amino)-benzoyl-aminobenzene. | Do. |
| 18 | ----do---- | 1-amino-2:4-di-para-chloro-benzoylaminobenzene. | Red. |
| 19 | 1-aminoanthra-quinone. | 2:5-dichloro-1-amino-4-benzoylaminobenzene. | Do. |
| 20 | ----do---- | 2:5-dichloro-1-benzoyl-amino-4-(4'-chloro-5'-amino)-benzoylamino-benzene. | Scarlet. |
| 21 | ----do---- | 2-chloro-5-methoxy-1-benzoylamino-4-(2':4'-dichloro-5'-amino)-benzoylamino-benzene. | Do. |
| 22 | 1-amino-2-brom-anthraquinone. | 2:5-dichloro-1-amino-4-benzoylaminobenzene. | Red. |
| 23 | 1-amino-8-chlor-anthraquinone. | 2:5-dichloro-1-benzoylamino-4-(4'-chloro-5'-amino)-benzoylamino benzene. | Scarlet. |
| 24 | 2-aminoanthra-quinone. | 2:5-dichloro-1-benzoyl-amino-4-(2':4'-dichloro-5'-amino)-benzoylamino-benzene. | Do. |
| 25 | 2-aminoanthra-quinone. | 2:5-dimethyl-1-benzoyl-amino-4-(2':4'-dichloro-5'-amino)-benzoylamino-benzene. | Red. |
| 26 | ----do---- | 2-aminoterephthalic acid dianilide. | Orange. |
| 27 | 2-amino-3-chlor-anthraquinone. | 2:5-dimethyl-1-amino-4-benzoylaminobenzene. | Bluish-red. |
| 28 | ----do---- | 2:5-dichloro-1-benzoyl-amino-4-(4'-chloro-5'-amino)-benzoylamino-benzene. | Scarlet. |
| 29 | ----do---- | 2:5-dichloro-1-benzoyl-amino-4-(2':4'-dichloro 5'-amino)-benzoylamino-benzene. | Red. |
| 30 | ----do---- | 2:5-dimethyl-1-benzoyl-amino-4-(2':4'-dichloro-5'-amino)-benzoylamino-benzene. | Red. |
| 31 | ----do---- | 2-amino-terephthalic acid dianilide. | Orange. |
| 32 | 2-amino-1:3-dichloroanthra-quinone. | 2:5-dichloro-1-benzoyl-amino-4-(2':4'-dichloro-5'-amino)-benzoylamino benzene. | Do. |
| 33 | ----do---- | 2:5-dichloro-1-benzoyl-amino-4-(4'-chloro-5'-amino)-benzoylamino-benzene. | Red. |
| 34 | ----do---- | 2:5-dimethyl-1-benzoyl-amino-4-(2':4'-dichloro-5'-amino)-benzoylamino-benzene. | Do. |
| 35 | ----do---- | 2-amino-terephthalic acid dianilide. | Scarlet. |
| 36 | 2-amino-3-brom-anthraquinone. | 2:5-dichloro-1-benzoyl-amino-4-(2':4'-dichloro-5'-amino)-benzoylamino-benzene. | Red. |
| 37 | ----do---- | 2:5-dimethyl-1-benzoyl-amino-4-(2:4'-dichloro-5'-amino)-benzoylamino-benzene. | Do. |
| 38 | ----do---- | 2:5-dichloro-1-benzoyl-amino-4-(4'-chloro-5'-amino)-benzoylamino-benzene. | Scarlet. |
| 39 | ----do---- | 2-amino-terephthalic acid dianilide. | Orange. |
| 40 | 1-amino-2:4-dibromoanthra-quinone. | 2:5-dichloro-1-benzoyl-amino-4-(2':4'-dichloro-5'-amino)-benzoylamino-benzene. | Brown-red. |
| 41 | ----do---- | 2:5-dimethyl-1-benzoyl-amino-4-(2':4'-dichloro-5'-amino)-benzoylamino-benzene. | Red. |
| 42 | ----do---- | 2:5-dichloro-1-benzoyl-amino-4-(4'-chloro-5'-amino)-benzoylamino-benzene. | Do. |
| 43 | ----do---- | 2-amino-terephthalic acid dianilide. | Do. |
| 44 | 1-amino-3-trifluoromethyl-anthraquinone. | 2:5-dichloro-1-benzoyl-amino-4-(2':4'-dichloro-5'-amino)-benzoylamino-benzene. | Scarlet. |
| 45 | ----do---- | 2:5-dimethyl-1-benzoyl-amino-4-(2':4'-dichloro-5'-amino)-benzoylamino-benzene. | Do. |
| 46 | ----do---- | 2:5-dichloro-1-benzoylamino-4-(4'-chloro-5'-amino)-benzoylaminobenzene. | Do. |
| 47 | ----do---- | 2-aminoterephthalic acid dianilide. | Orange. |
| 48 | ----do---- | 2:5-dichloro-1-benzoyl-amino-4-(4'-methoxy-3'-amino)-benzoylamino-benzene. | Do. |
| 49 | ----do---- | 2:5-dimethyl-1-benzoyl-amino-4-(4'-methoxy-3'-amino)-benzoylamino-benzene. | Red. |

The 1-amino-3-trifluoromethylanthraquinone was obtained as follows:

1-amino-2-methyl-4-bromanthraquinone was converted into 1 - bromo - 3 - methylanthraquinone (M.P. 204 to 205.5° C.) by diazotizing and then boiling the diazonium salt in alcohol. 1-chloro-3-trichloromethylanthraquinone (M.P. 155.5 to 156.5° C.) was obtained by chlorination in boiling ortho-dichlorobenzene. Treatment with anhydrous hydrofluoric acid yielded 1-chloro-3-trifluoromethylanthraquinone, which gave 1-toluene-sulfonyl-amino-3-trifluoromethylanthraquinone (M.P. 228.5 to 229° C.) when reacted with para-toluene sulfonamide. The 1-toluene-sulfonylamino - 3 - trifluoromethylanthraquinone was hydrolysed with cold, concentrated sulfuric acid to form 1 - amino - 3 - trifluoromethylanthraquinone (M.P. 223.5 to 224.5° C.)

*Analysis.*—Calculated: C, 61.86; H, 2.77; N, 4.81; F, 19.57. Found: C, 62.01; H, 2.90; N, 4.71; F, 19.60.

Example 2

13.38 parts of 1-amino-3-chloranthraquinone were diazotized with 75 parts of monohydrate and 4 parts of sodium nitrite in a mannner analogous to that described in Example 1, and the reaction mixture poured on to 250 parts of ice.

10.92 parts of 100% 1-(3'-carboxy)-phenyl-3-methyl-5-pyrazolone were dissolved in 260 parts of a 1:1 alcohol and water mixture and 10 parts of 30% sodium hydroxide solution. After filtering until clear, 20 parts of sodium acetate were added and the pH value adjusted to 6 with acetic acid.

Coupling was carried out at 1 to 10° C. at a pH value of 4–6 in a manner analogous to that described in Example 1. 70 parts of a brown filter residue were obtained.

The press-cake was dried azeotropically in 390 parts of dichlorobenzene in a manner analogous to that described in Example 1. After cooling to 95° C., one part of dimethylformamide, 12 parts of thionyl chloride and a further 130 parts of dichlorobenzene were added dropwise. Stirring was continued for 2 hours at 100° C., the reaction mixture cooled to 20° C., filtered, and the filter residue washed with 340 parts of dichlorobenzene and 300 parts of benzene. After drying, 17.5 parts of light brown acid chloride were obtained.

2.55 parts of the acid chloride were introduced into 130 parts of dichlorobenzene and then condensed with 2.60 parts of 2:5-dichloro-1-benzoylamino-4-(2':4'-dichloro-5'-amino)-benzoylaminobenzene, dissolved in 100 parts of hot dichlorobenzene, in a manner analogous to that described in Example 1. The reaction mixture was filtered, the residue washed with 160 parts of hot dichlorobenzene, 80 parts of methanol and 100 parts of water; yield: 3.9 parts of a yellow dyestuff of the formula

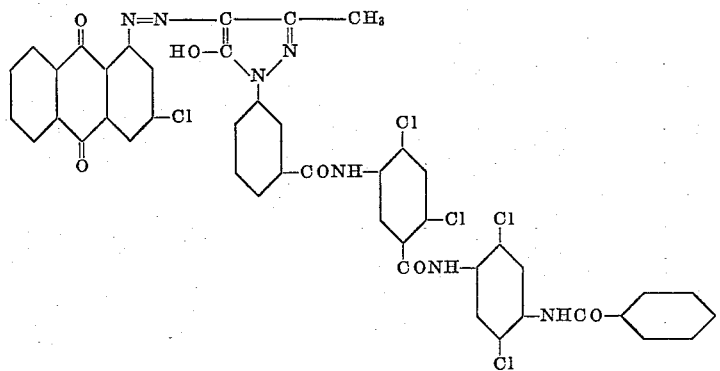

It colored polyvinyl chloride yellow tints possessing a good fastness to light and to migration.

By using 2-chloro-5-methoxy-1-benzoylamino-4-(2':4'-dichloro-5'-amino)-benzoylaminobenzene as condensation base, a dyestuff possessing similar properties was obtained.

Example 3

51.5 parts of 1-amino-3-chloranthraquinone were diazotized with 300 parts of monohydrate and 16 parts of sodium nitrite in a manner analogous to that described in Example 1 and the diazo solution was poured on to 1000 parts of ice.

Meanwhile 26 parts of acetoacetic acid ester were dissolved in 200 parts of isopropanol, 200 parts of water and 28 parts of 30% aqueous sodium hydroxide solution, a further 600 parts of water were added, the pH value was adjusted to 6 with acetic acid and then 70 parts of sodium acetate were added.

The diazonium sulfate was run in at 10 to 15° C. while maintaining the pH value at 4 to 6.

After the coupling, the reaction mixture was heated to 70° C., suction-filtered and the filter residue washed until free from salt. After drying, 77.5 parts of a yellow azo ester melting at 186 to 189° C. were obtained of the formula

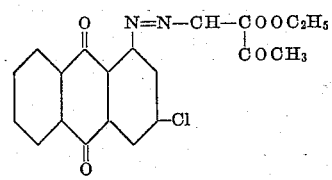

69 parts of this ester, 625 parts of methanol, 500 parts of water and 78 parts of aqueous 30% sodium hydroxide solution were heated to 55 to 58° C. for 75 minutes. The reddish brown suspension was acidified, the yellow acid that precipitated was filtered off and washed until the washings ran neutral. After drying, 63.9 parts of an azo acid melting at 248 to 250° C. were obtained.

69.8 parts of the azo acid were heated in 700 parts of dichlorobenzene to 90° C., and then 0.5 part of dimethylformamide and 59 parts of thionyl chloride were added. The reaction mixture went into almost complete solution after 30 to 40 minutes. After stirring at 100 to 105° C. for a period totalling 1½ hours, the solution was cooled to 0° C., filtered, and the filter residue washed with 130 parts of dichlorobenzene and 300 parts of benzene. 45.8 parts of a dry acid chloride melting at 228 to 236° C. (with decomposition) were obtained.

1.95 parts of this acid chloride were suspended in 130 parts of dichlorobenzene. 2.28 parts of 2:5-dichloro-1-benzoylamino-4-(4'-chloro-3'-amino) - benzoylaminobenzene dissolved in 190 parts of dichlorobenzene were then added. The whole was stirred for 2½ hours at 100° C., the temperature raised to 140° C. in the course of 4 hours, and the mixture was then allowed to react for 10 hours at 140 to 145° C. The reaction mixture was filtered at 90° C., the residue washed with 390 parts of dichlorobenzene, 200 parts of methanol and 200 parts of water; yield: 3.5 parts of a greenish yellow pigment of the formula

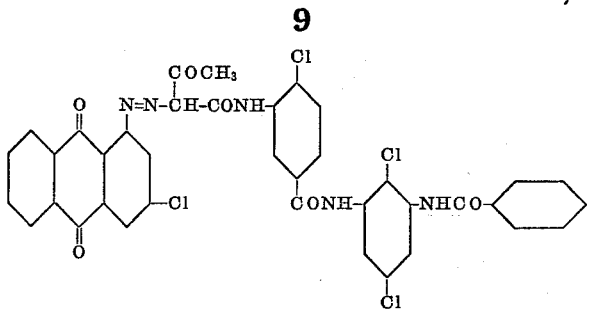

which gave greenish yellow tints possessing a good fastness to migration when worked into polyvinyl chloride on a roller mill.

*Example 4*

5.15 parts of 1-amino-3-chloranthraquinone were diazotized with 50 parts of monohydrate and 1.5 parts of sodium nitrite in a manner analogous to that described in Example 1, and the solution poured on to 150 parts of ice. 6.81 parts of 2:3-hydroxynaphthoic acid-2′:4′-dichloro-5′-carboxylic acid anilide were dissolved in 150 parts of a 1:1 isopropanol and water mixture and 4 parts of 30% sodium hydroxide solution. After filtering until clear, 10 parts of sodium acetate were added and the pH value adjusted to 6 with acetic acid.

Coupling was carried out at 10° C. and at a pH value of 4 to 6 in a manner analogous to that described in Example 1. 50 parts of red filter residue were obtained.

The press-cake was dried azeotropically in 195 parts of dichlorobenzene in a manner analogous to that described in Example 1. After cooling to 95° C., 1.2 parts of dimethylformamide and 6.5 parts of thionyl chloride were added dropwise. The whole was stirred for 2 hours at 100° C., cooled to 20° C., filtered, and the filter residue washed with 120 parts of dichlorobenzene and 120 parts of benzene. After drying, 10.05 parts of a red acid chloride were obtained.

1.50 parts of this acid chloride were introduced into 120 parts of dichlorobenzene and then condensed as described with 0.668 part of 2:5-dichloro-4-benzoylamino-1-aminobenzene dissolved in 80 parts of hot dichlorobenzene. The reaction mixture was filtered, and the filter residue washed with 150 parts of hot dichlorobenzene, 80 parts of methanol and 100 parts of water. 1.65 parts of a dyestuff were obtained identical with the dyestuff produced by the process described in Example 1.

By using para-benzoylaminoaniline as condensation base, a dyestuff was obtained which yielded bluish red tints when worked into polyvinyl chloride on a roller mill.

What is claimed is:

1. A monoazo pigment of the formula

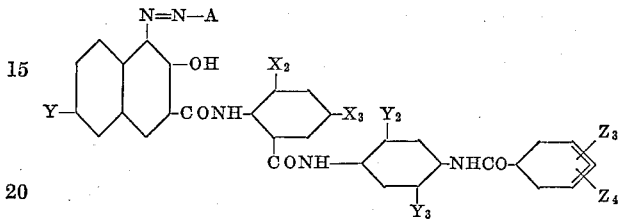

in which A is anthraquinonyl chloroanthraquinonyl, or trifluoromethyl anthraquinonyl, Y a member selected from the group consisting of hydrogen, chlorine, bromine and lower alkoxy, $X_2$, $X_3$, $Y_2$, $Y_3$, $Z_3$ and $Z_4$ represent members selected from the group consisting of hydrogen, chlorine, bromine, lower alkyl and lower alkoxy.

2. A monoazo pigment of the formula

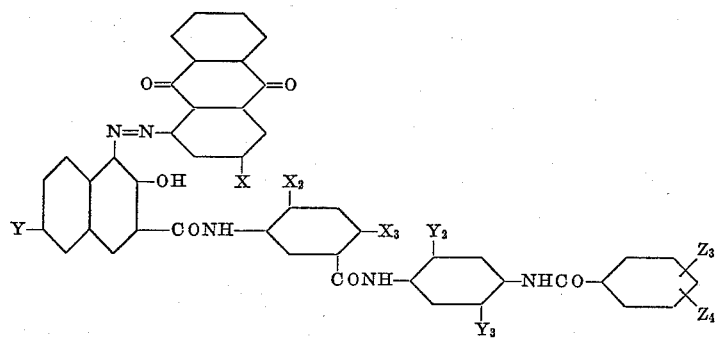

in which X is a member selected from the group consisting of chlorine, bromine and trifluoromethyl, Y a member selected from the group consisting of hydrogen, chlorine, bromine and lower alkoxy, $X_2$, $X_3$, $Y_2$, $Y_3$, $Z_3$ and $Z_4$ represent members selected from the group consisting of hydrogen chlorine, bromine, lower alkyl and lower alkoxy.

3. A monoazo pigment of the formula

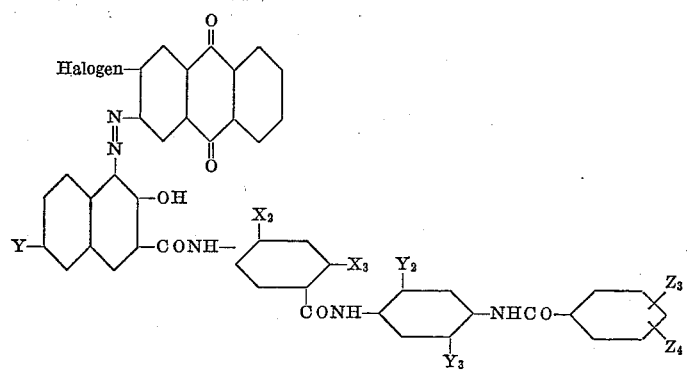

in which Y a member selected from the group consisting of hydrogen, chlorine, bromine and lower alkoxy, $X_2$, $X_3$, $Y_2$, $Y_3$, $Z_3$ and $Z_4$ represent members selected from the group consisting of hydrogen, chlorine, bromine, lower alkyl and lower alkoxy.

4. A dyestuff of the formula
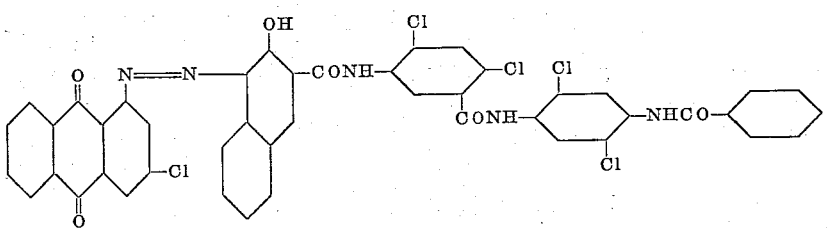
5. The dyestuff of the formula
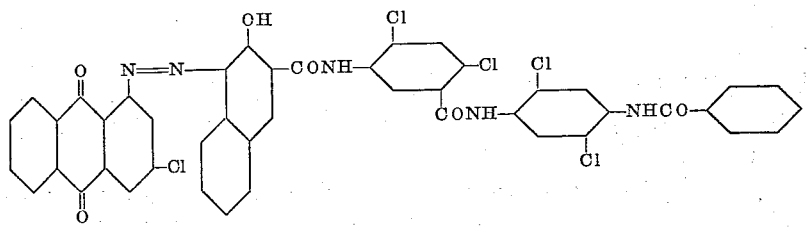
6. The dyestuff of the formula
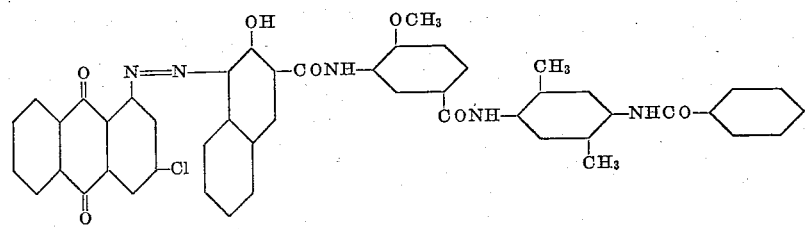
7. The dyestuff of the formula
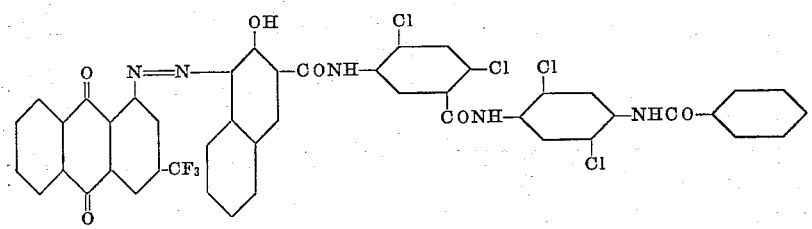
No references cited.
CHARLES B. PARKER, *Primary Examiner.*
DONALD M. PAPUGA, *Assistant Examiner.*

UNITED STATES PATENT OFFICE
CERTIFICATE OF CORRECTION

Patent No. 3,331,832                              July 18, 1967

Hansrolf Loeffel

It is hereby certified that error appears in the above numbered patent requiring correction and that the said Letters Patent should read as corrected below.

Column 10, lines 11 to 21, the right-hand side of the formula should appear as shown below instead of as in the patent:

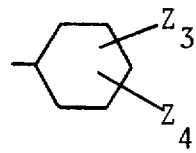

columns 11 and 12 about lines 15 to 20, the right-hand side of the formula should appear as shown below instead of as in the patent:

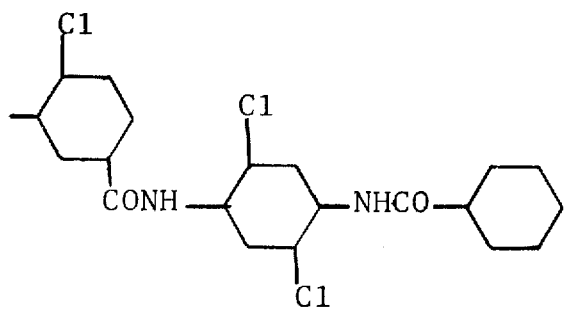

Signed and sealed this 30th day of July 1968.

(SEAL)
Attest:

EDWARD M. FLETCHER, JR.                        EDWARD J. BRENNER
Attesting Officer                                Commissioner of Patents